May 11, 1948.　　　　E. J. RIVOIRA　　　　2,441,291
SPINDLE POSITIONING MECHANISM
Filed Sept. 9, 1944　　　5 Sheets-Sheet 2
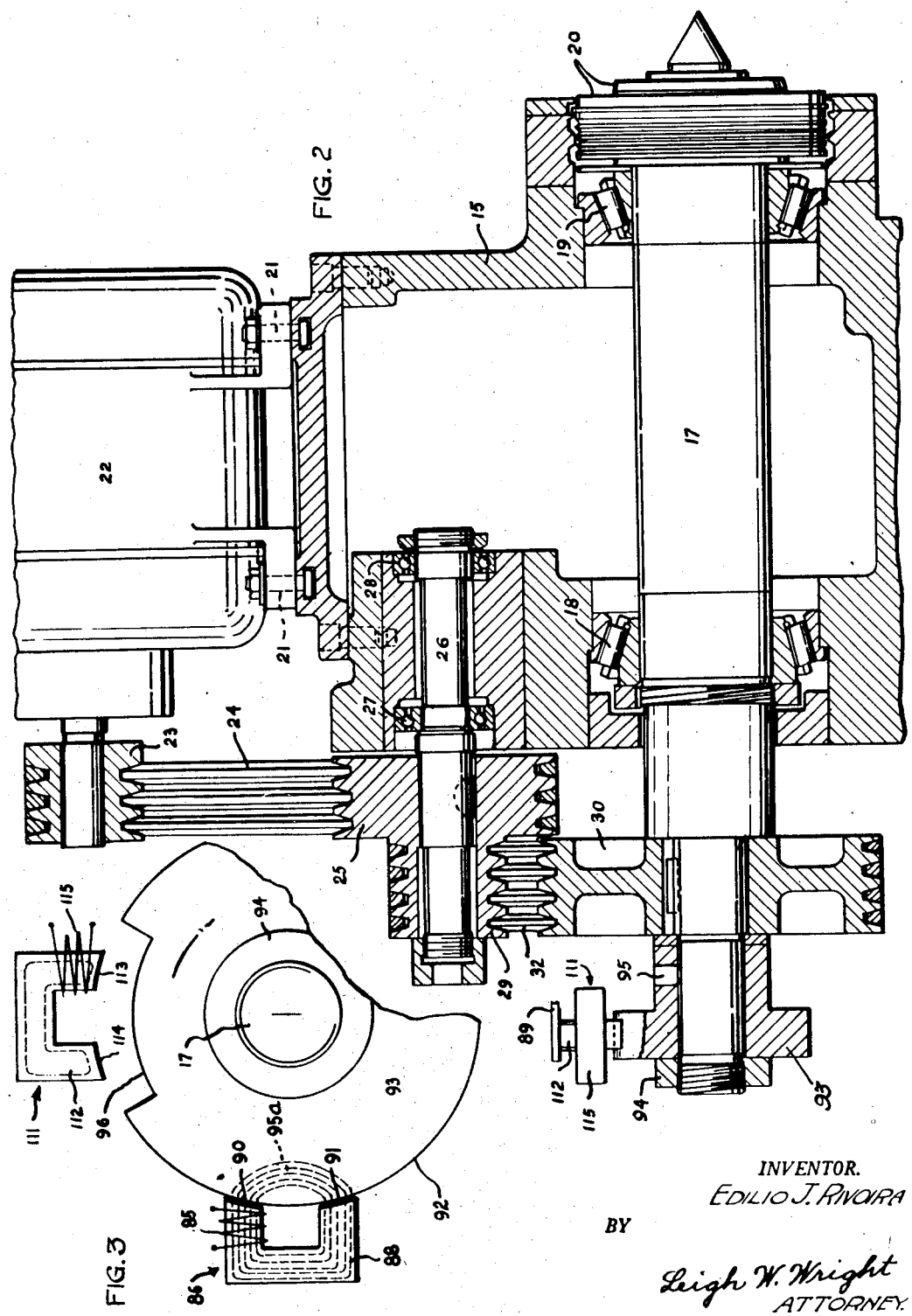
INVENTOR.
EDILIO J. RIVOIRA
BY
Leigh W. Wright
ATTORNEY.

May 11, 1948.  E. J. RIVOIRA  2,441,291
SPINDLE POSITIONING MECHANISM
Filed Sept. 9, 1944  5 Sheets-Sheet 3

INVENTOR.
EDILIO J. RIVOIRA
BY
Leigh W. Wright.
ATTORNEY

May 11, 1948.  E. J. RIVOIRA  2,441,291
SPINDLE POSITIONING MECHANISM
Filed Sept. 9, 1944  5 Sheets-Sheet 4
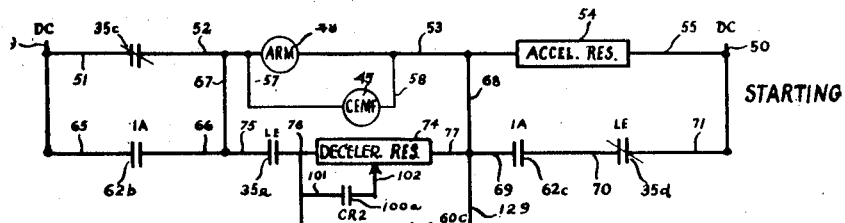
FIG. 6  STARTING
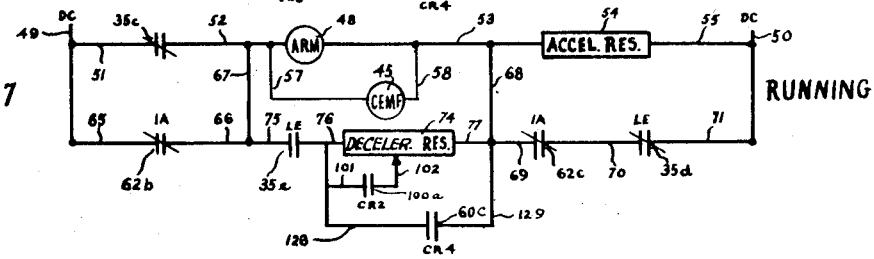
FIG. 7  RUNNING
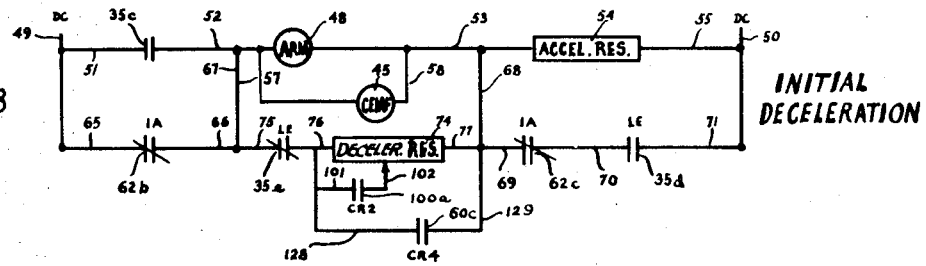
FIG. 8  INITIAL DECELERATION
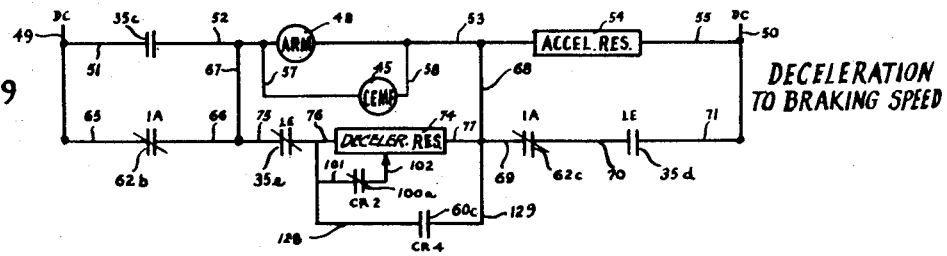
FIG. 9  DECELERATION TO BRAKING SPEED
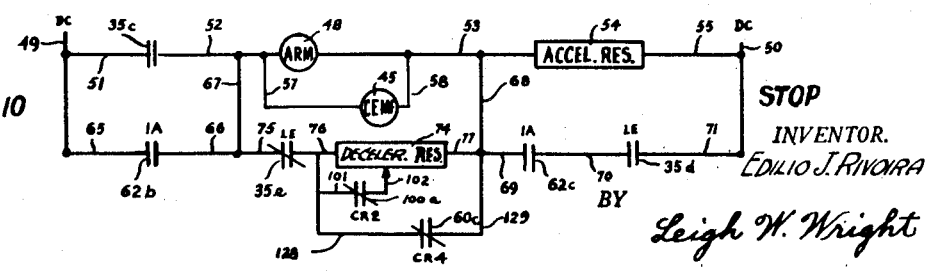
FIG. 10  STOP
INVENTOR.
Edilio J. Rivoira
BY
Leigh W. Wright
ATTORNEY.

Patented May 11, 1948

2,441,291

UNITED STATES PATENT OFFICE 2,441,291

SPINDLE POSITIONING MECHANISM

Edilio J. Rivoira, Silverton, Ohio, assignor to The Cincinnati Milling Machine Co., Cincinnati, Ohio, a corporation of Ohio Application September 9, 1944, Serial No. 553,441

12 Claims. (Cl. 318—301)

1

This invention pertains to spindle control and positioning mechanism for machine tools and more particularly to apparatus for accurately stopping a work spindle in a predetermined rotary position at the completion of a machining cycle.

One of the objects of this invention is to provide a simplified, highly accurate, and trouble-free control for stopping a work spindle in a predetermined position.

And another object is to provide an improved electric control for accurately stopping a rotating machine tool spindle in a predetermined rotary position.

Still another object of this invention is to provide a positioning control for a machine tool spindle in which the prime mover is the sole means connected to the spindle for driving and retarding said spindle to bring it to a predetermined rotary position.

And a further object is to provide a spindle positioning control in which a signal is transmitted magnetically from the rotating spindle to the control to accurately determine the position of stopping of the spindle.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Throughout the several views of the drawings similar reference characters are employed to denote the same or similar parts.

Figure 2 is a diagrammatic section through the headstock and drive for the work spindle on the line 2—2 of Figure 1.

Figure 3 is a diagrammatic enlarged end view of the signal transmitting mechanism associated with the work spindle.

Figure 6 is an elementary electric power circuit diagram for the prime mover shown at the time of starting the prime mover.

Figure 7 is an elementary electric power circuit

2 diagram for the prime mover shown at the time of normal running speed of the prime mover.

Figure 8 is an elementary electric power circuit diagram for the prime mover shown at the time of the initial deceleration of the prime mover.

Figure 9 is an elementary electric power circuit diagram for the prime mover shown at the time of the second deceleration of the prime mover to braking speed.

Figure 10 is an elementary electric power circuit diagram for the prime mover shown at the time of stopping of the prime mover.

Figure 5:
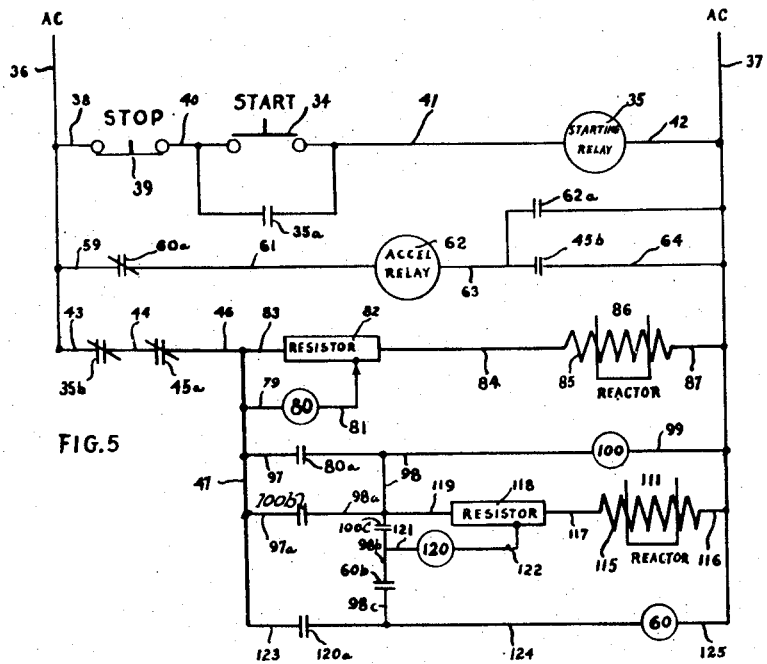
Figure 5 is an elementary wiring diagram of the control circuit for the spindle control mechanism, shown in deenergized condition.
Figure 11:
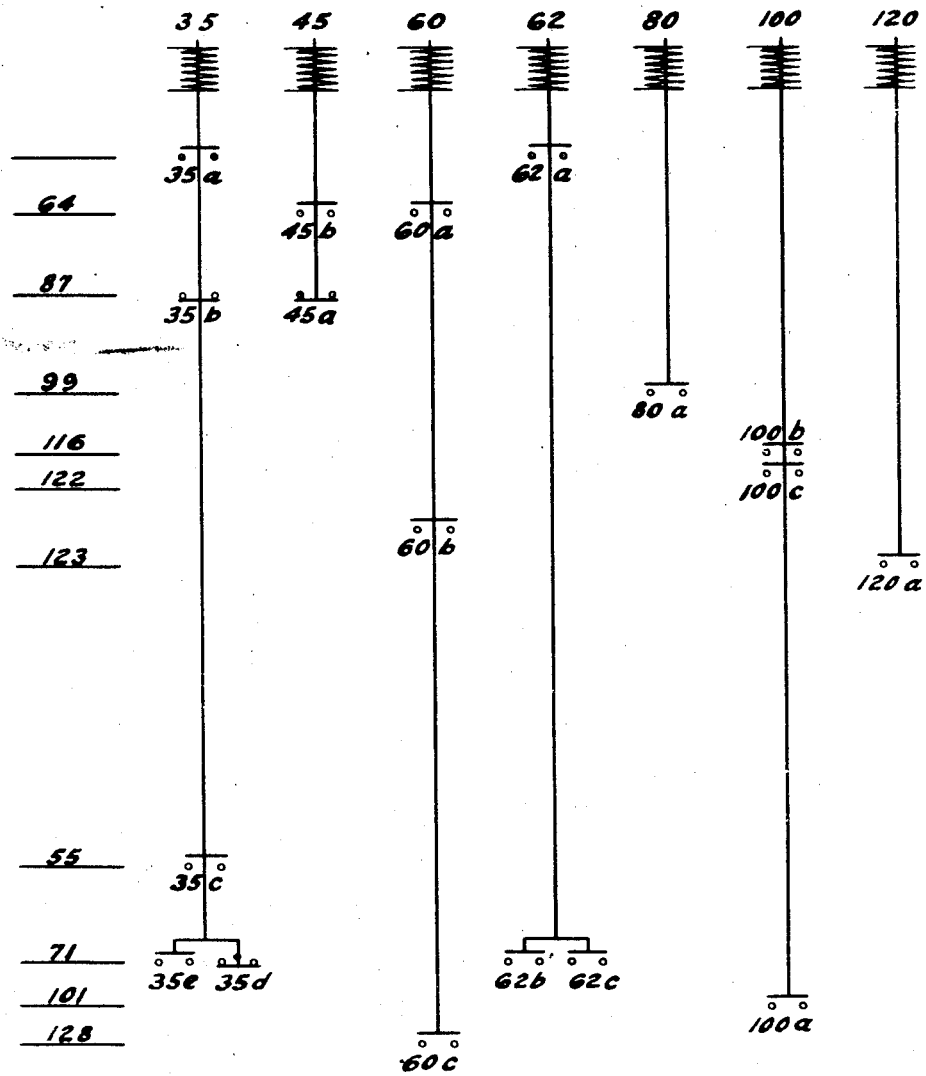

Figure 11 is a chart showing the relationship of the various solenoid actuated contacts with their respective solenoids, and also the lines in both the circuits shown in Figure 5 and the circuit shown in Figure 6 in which the contacts are located.

For illustrative purposes this invention is shown applied to a machine tool headstock comprising a housing 15 mounted on the machine frame 16 and having journaled therein the work spindle 17 on suitable bearings 18 and 19. The work spindle is usually provided with a spindle nose portion 20 to which may be attached the work holder comprising a driving face plate, chuck, or work fixture, which is to be rotated in the presence of a cutting tool (not shown) fed to it by the feeding mechanism of the machine. In such an arrangement it frequently becomes necessary to load the work in the work holder in a particular radial direction in order to prevent contact of the work with the cutting tool. It is also essential that the work spindle be rapidly and automatically brought to a stop in a predetermined position at the completion of the cutting operation so that the operator may promptly remove the finished work and insert a new rough piece to be machined with a minimum loss of productive time and effort on the part of the operator.

In this improved spindle control mechanism there is provided a prime mover or motor 22 fixed to the headstock 15 by suitable bolts 21 and which is connected to drive the work spindle through the motor pulley 23, the belts 24, and the idler pulley 25 fixed to an idler shaft 26 journaled in the suitable bearings 27 and 28 mounted in the headstock housing 15. Formed integral with the idler pulley 25 is idler pulley 29 which drives the pulley 30 fixed on the spindle 17 through appropriate belts 32.

Figure 4:
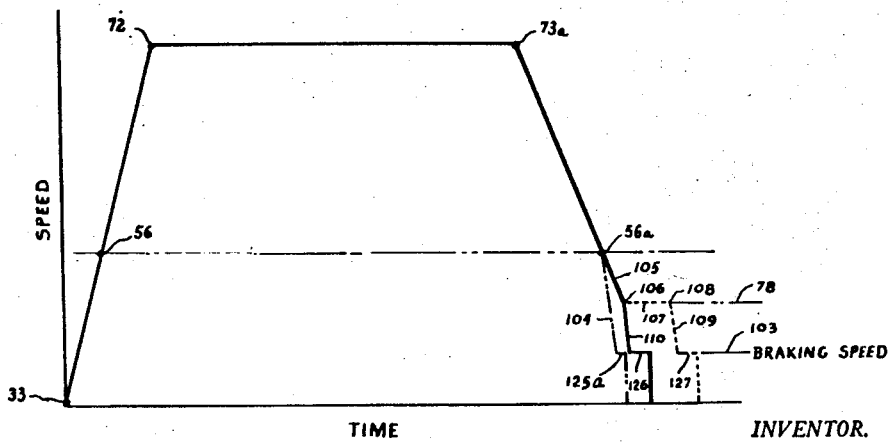
Figure 4 is a motor acceleration and deceleration diagram for a complete operating cycle of the machine.

The operation of this spindle control and positioning mechanism may best be understood by tracing a typical operating cycle of the machine as shown in the diagram, Figure 4. With the prime mover or motor 22 stopped, as indicated at position 33, the start button 34, Figure 5, is pressed to energize the motor starting relay coil 35 from the alternating control current supply lines 36 and 37 through the control circuit comprising the line 38, normally closed stop push button 39, and the lines 40, 41, and 42. This causes control contact 35a to close to maintain the relay coil 35 energized after the start button is released. For reference the chart in Figure 11 shows the relationship of all the switch contacts with their respective relays and also as far as possible with the circuit lines of both Figures 5 and 6 in which the contacts are located. Energizing the relay coil 35 also opens control contact 35b, connected to line 36 by the line 43 and through line 44, normally closed contacts 45a of the counter E. M. F. control relay coil 45, Figure 6, and the line 46 to line 47 to deenergize the pilot signaling or positioning control circuits between the lines 37 and 47, Figure 5. The energizing of the relay coil 35 closes the normally open power contacts 35c and 35d and opens the normally closed power contact 35e. Current is then fed to the armature 48 of the motor 22 from the direct current power supply lines 49 and 50, through a power circuit comprising line 51 connected to power line 49, power contact 35c, line 52, and line 53, accelerating resistor 54, and line 55 connected to the power line 50.

As the motor 22 accelerates beyond a certain speed indicated at 56 in Figure 4, the counter E. M. F. developed by the armature 48 energizes the counter E. M. F. relay coil 45 shunted across the armature 48 by the lines 57 and 58, opening the normally closed control contact 45a, Figure 5, connected between the lines 44 and 46 so as to maintain the positioning control circuit deenergized when the starting control relay coil 35 is again deenergized in stopping. Energizing the counter E. M. F. relay coil 45 also closes control contact 45b so as to complete a circuit from the line 36 through the line 59, normally closed control contact 60a, line 61, accelerating relay coil 62, and line 63 and then through line 64 connected to the other supply line 37 to thus energize the relay coil 62 to cause control contact 62a to close and maintain relay coil 62 energized. Energizing the coil 62 causes its normally open associated power contacts 62b and 62c to be closed, as shown in Figure 7, to shunt out accelerating resistor 54 and to permit full power to be supplied to the armature 48 through the circuit 51, 35c and 52, and the parallel circuit 65, 62b, 66, and 67 from the power supply line 49 and through the circuit 53, 68, 69, 62c, 70, 35d, and 71 connected to the power supply line 50 to thus operate the motor 22 at normal running speed beginning at the point 72, Figure 4.

At the completion of the machining cycle or at any time when it is desired to stop the spindle rotation to examine the work piece, the stop button 39 may be pressed to decelerate the motor 22 to effect an initial deceleration from a point 73a in the diagram, Figure 4. Connection between the lines 38 and 40, Figure 5, is thus broken to deenergize the starting relay coil 35 which opens up the control contact 35a to maintain the coil deenergized after the stop button is released. Deenergizing the coil 35 also closes the contact 35b, connecting line 43 with line 44 and also opens the power contacts 35c and 35d while closing power contact 35e as shown in Figure 8. Opening of power contact 35d at this time inserts the accelerating resistor 54 in the power circuit from the line 49 through contact 62b and the armature 48, while the closing of power contact 35e shunts a decelerating or braking resistor 74 across the armature 48 through the circuit 52, 67, 75, 35e, 76, the resistor 74, and the lines 77, 68, and 53. Thus, the counter E. M. F. in the armature will be opposed by the resistor 74 to rapidly decelerate the driving motor to a predetermined speed indicated at 78 in Figure 4, at which point the accelerating resistor permits a limited supply of power to the armature 48 from the power lines 49 and 50 to thus continue rotation of the motor at that predetermined speed.

After the motor 22 reaches the initial reduced speed 78, Figure 4, additional electrical control apparatus is provided to further reduce the speed of the motor to a second predetermined slow speed or braking speed, then to maintain rotation of the motor at the braking speed until the work spindle has rotated to a predetermined position at which point the motor and spindle are brought to an immediate stop. As the motor decelerates to the point 56a, Figure 4, the decrease in the armature counter E. M. F. at that point causes the relay coil 45 to drop out opening control contact 45b connected in parallel with control contact 62a which remains closed at this time so that relay coil 62 remains energized to keep power contacts 62b and 62c closed, Figure 9. Control contact 45a also closes energizing the positioning control circuits between lines 37 and 47. Current is then connected from line 47 and through line 79, relay coil 80, and line 81 to the resistor 82 which is also connected in parallel with coil 80 through line 83 to line 47. The resistor 82 is connected by line 84 to one end of the inductance coil 85 of a variable core reactor 86, the other end of the inductance coil 85 being connected by line 87 to line 37. The resistor 82 serves to regulate the flow of current to the relay coil 80 to maintain its proper operation when energized.

Figure 1:
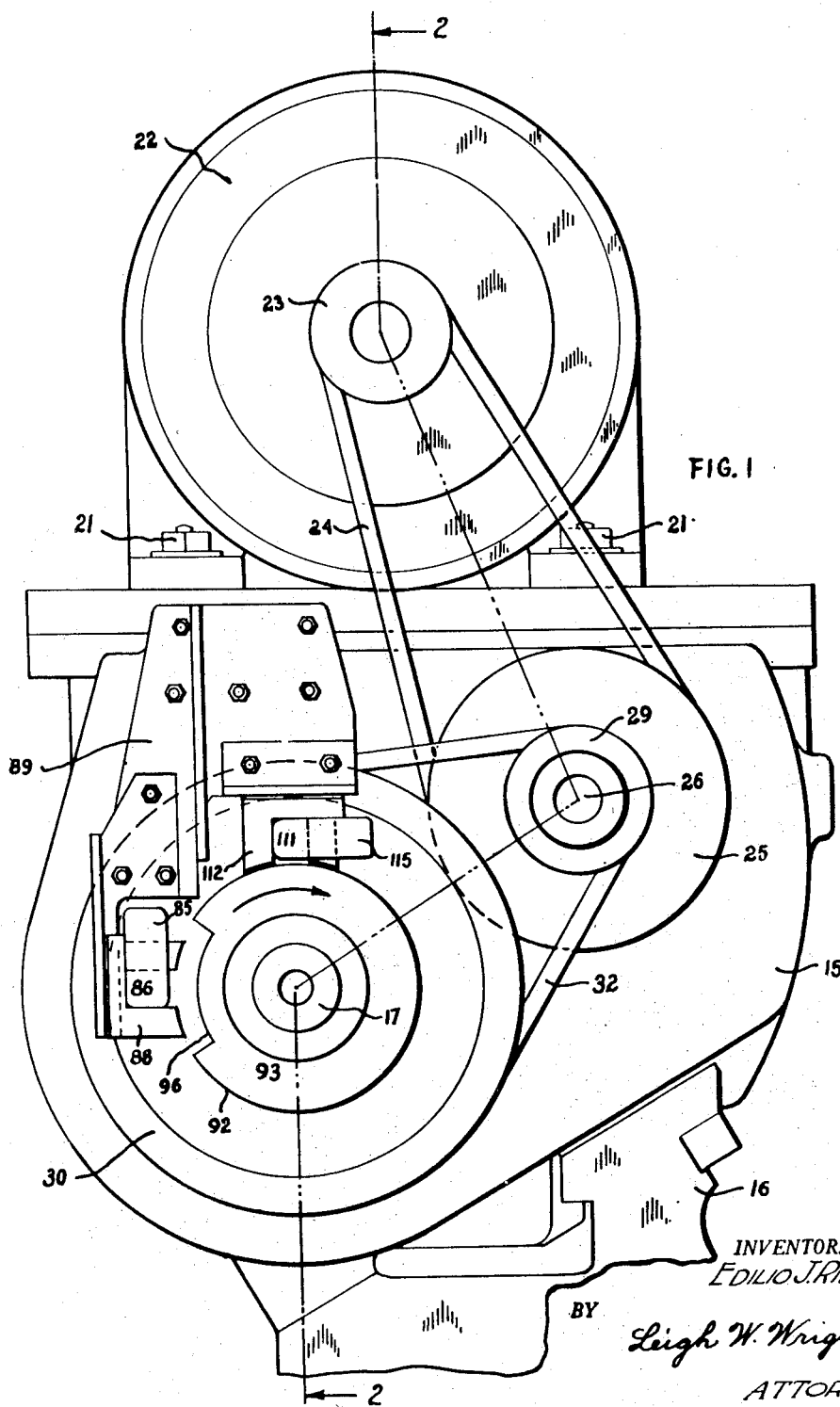
Figure 1 is a left hand end view of a typical machine tool spindle headstock incorporating the features of this invention.

The reactor 86, Figures 1 and 3, comprises a U-shaped core 88 mounted on a bracket 89 fixed on the headstock housing 15 having a pair of arcuate pole faces 90 and 91 positioned in close proximity to the periphery 92 of a movable core or control disc 93 fixed on the work spindle 17 by a suitable nut 94 and set screw 95 whereby the disc may be adjusted relative to the spindle to change the stopping position of the spindle. The inductance coil 85 is suitably wound on the core 88 so as to react to changes in the magnetic flux in the core. Thus, when the periphery 92 of the control disc 93 is presented to the pole faces 90 and 91, upon rotation of the spindle as shown in Figure 3, a strong magnetic flux will flow through the core 88 and through the disc as indicated at 95a to thereby greatly decrease the flow of current through the inductance coil 85 and therefore between the lines 87 and 84 so that under these conditions relay coil 80 will not be operated. When the notch 96 cut in the periphery 92 of the disc 93 is rotated in position with pole surfaces 90 and 91, as shown in Figure 1, the magnetic flux in the core 88 will be greatly reduced to thereby permit increased flow of current through the inductance coil 85 and associated circuit to cause relay coil 80 to operate. Thus, in effect the disc 93 constitutes a movable portion of the core of the reactor adapted to vary the inductance thereof by changing the flux in the core of the reactor.

As soon as the rotating spindle and control disc 93 decelerate to the point 56a, Figure 4, the control circuit connected to the inductance coil 85 will be energized by closing contact 45a so that the next time notch 96 is rotated in front of the reactor 86, as shown in Figure 1, it will be operated to cause current to flow through the inductance coil 85 energizing relay coil 80 to close control contact 80a to complete a circuit from line 47, through lines 97, 98 and 99 to energize a relay coil 100. This causes power contact 100a, Figure 9, to close and through lines 76, 101 and 102 to shunt out a portion of the resistor 74 thereby applying a lower resistance shunt across the armature to still further oppose the counter E. M. F. therein to reduce the speed of the motor to the predetermined braking speed 103, Figure 4. The motor continues to rotate at the braking speed by current supplied through the accelerating resistor 54 as in the case of the initial slow speed 78, Figure 4, since power contact 35d remains open during the second deceleration of the motor to braking speed as shown in Figure 9.

Referring to Figure 4, various conditions of deceleration of the motor 22 may take place after it decelerates to the point 56a depending upon the relative position of the notch 96 of the control disc with respect to the reactor 86 when the contact 45a closes to energize the positioning circuits and render reactor 86 effective. In the instance where the notch 96 arrives in actuating position with the reactor 86, as shown in Figure 1, at the same instant that the motor and spindle have decelerated to the point 56a to close the contact 45a it is obvious that the reactor 86 will simultaneously be rendered effective by energizing its associated circuit and actuated by the presence of the notch 96 to cause current to flow to relay coil 80 to energize relay coil 100 to close power contact 100a reducing the value of the resistor 74. In this instance the motor 22 immediately begins the second deceleration along the line 104 indicated in Figure 4 until it reaches the braking speed 103.

In another condition of initial deceleration the notch 96 may have just rotated past actuating position with the reactor 86 at the instant it is rendered effective by closing of control contact 45a so that the power contact 100a will not be closed immediately. The spindle will therefore slow down as indicated by the line 105 under the influence of the full resistor 74 first to the initial predetermined speed 78 and then at the point 106 will continue rotation at that speed along the line 107 by current supplied through resistor 54 until the notch 96 finally rotates around in position to actuate reactor 86 at the point 108, whereupon contact 100a is closed to decelerate the spindle along the line 109 down to the initial braking speed 103.

In still another instance of deceleration the notch 96 may be so located that it will rotate into operative position with the reactor 86 when the motor has just completed its first deceleration at the point 106 in which case the second deceleration will take place along the line 110 down to the braking speed 103. Obviously, any intermediate condition of deceleration may take place between the line 104 and the line 105 to 109 inclusive as shown on the diagram, Figure 4.

In order to effect the final braking or stopping of the spindle in a predetermined position there is provided a second reactor 111, Figures 1, 2, and 3, of the same construction as the reactor 86, comprising a core 112 mounted on the bracket 89 and having arcuate pole faces 113 and 114 associated with the periphery of the control disc 93 as in the case of the reactor 86. A suitable inductance coil 115 is provided around the core 112 and has one of its ends connected through a line 116 to line 37 and its other end connected through a line 117 to a resistor 118 connected through line 119 to line 98. A relay coil 120 is also connected in parallel with the resistor 118 by means of lines 121 and 122 so that the resistor serves as a means for regulating the current flow in the relay coil 120 for its proper operation.

The circuit containing the reactor 111 and the relay coil 120 is energized at the same instant that the notch 96 operates the reactor 86 by closing associated control contacts 100b and 100c. Closing of contact 100b maintains relay coil 100 energized through the circuit 47, 97a, 98a, 98, 99, and 37 after notch 96 rotates away from actuating position with reactor 86. The reactor 111 is positioned in relation to the reactor 86 so that it will be actuated by the notch 96 just after the notch has actuated the reactor 86. Thus, when the reactor 111 is actuated by the notch as shown in Figure 3, current flowing in the control circuit associated with its inductance coil 115 will energize the relay coil 120 to close control contact 120a which, in turn, energizes relay coil 60 through circuit 123, 120a, 124, and 125 to close power contact 60c, Figure 10, which, through the lines 128 and 129, will provide a low resistance shunt or a substantially dead short across the armature to instantly arrest its further rotation and bring the work spindle and control disc 93 instantly to a stop in a predetermined position shown in Figure 3. The control contact 60a is also opened at the same instant to deenergize the accelerating relay coil 62 which causes power contacts 62b and 62c to open so as to cut out all power supply to the motor armature. Also a control contact 60b closes to maintain relay coil 60 energized through circuit 47, 97a, 100b, 98a, contact 100c, 98b, 98c, and 124 in the event the spindle is manually rotated so as to move notch 96 away from the reactor 111.

It is to be noted that the reactor 111 is set a sufficient distance beyond the reactor 86 to in every instance permit the motor to reach the braking speed 103 and to rotate thereat for an appreciable interval as indicated at 125a, 126 and 127, Figure 4, before the notch 96 arrives at the actuating position, shown in Figure 3, to operate the reactor for final stopping. In this way the reactor 111, to effect the final braking and stopping of the spindle, is always actuated while the motor and spindle are rotating at a predetermined slow braking speed and always occurs at a precise circumferential position of the work spindle as determined by the notch 96 as it arrives in actuating position with the reactor 111, Figure 3, resulting in a high degree of accuracy and duplication of the stopping position for the work spindle.

Summarizing the general operation of this spindle control and positioning mechanism: with the motor 22 stopped, as at the position 33 in Figure 4, pressing the start button cuts out the adjustable decelerating resistor and connects the accelerating resistor in series with the motor armature. The counter E. M. F. developed in the armature by acceleration of the motor automatically cuts out the accelerating resistor and places the motor directly on the power lines for normal running speed.

With the motor 22 operating at normal running speed, pressing the stop button reconnects the accelerating resistor in series with the motor armature while at the same time shunting the decelerating resistor across the armature to cause an initial deceleration of the motor. When the motor slows down to an initial predetermined reduced speed, a decrease in counter E. M. F. in the armature renders the first of a pair of electric control reactors effective. By means of a magnetic connection between the reactors and the spindle, rotation of the spindle to a predetermined position magnetically actuates the first reactor to simultaneously reduce the value of the decelerating resistor to slow down the motor to a further reduced predetermined braking speed and to render the second reactor effective. Continued rotation of the spindle a partial revolution at the braking speed to a final predetermined position magnetically actuates the second reactor to disconnect the power supply and short circuit the motor armature to effect instant accurate stopping and positioning of the motor and spindle.

There has thus been provided an improved control and positioning mechanism for machine tool spindles which is highly efficient and accurate in operation.

What is claimed is:

1. In a machine tool spindle control and positioning mechanism, a driving motor, a spindle, a driving connection between said motor and spindle, an electric control means for said motor, and a magnetic connection between said spindle and said electric control means, operable by the rotation of said spindle to a predetermined position, to stop said motor and arrest rotation of said spindle through said driving connection, said motor serving as the sole means for driving, stopping, and positioning said spindle.

2. In a machine tool, a spindle adapted to be driven by an electric motor, electric control means for said motor including a power control circuit for accelerating, decelerating, and stopping rotation of said motor, a pilot control circuit associated with said power circuit, a pair of spaced reactors connected in said pilot circuit, a control member on said spindle adapted to magnetically actuate said reactors in sequential relationship upon rotation of said spindle to predetermined positions to effect a deceleration and stopping of said motor.

3. In a machine tool spindle driving mechanism including a driving motor, a spindle adapted to be driven from said motor, an electric power source, and an electric control mechanism for applying said power source to said motor including the combination of a power circuit having an accelerating resistor and a decelerating resistor, contactor means for operatively connecting said accelerating resistor in said power circuit when starting said motor, other contactor means for simultaneously operatively connecting both of said resistors in said power circuit for decelerating said motor, an inductive pilot control circuit operable to actuate said contactors, and magnetic interconnecting means between said spindle and said pilot circuit to operate said circuit upon rotation of said spindle.

4. In a machine tool spindle drive control having an electric driving motor, a spindle adapted to be driven by said motor, and an electric control mechanism for applying an electric power source to said motor, the combination of a power circuit having an accelerating resistor and a variable decelerating resistor, an inductive pilot control circuit associated with said power circuit, and means for rendering said pilot circuit effective comprising a pair of sequentially actuated reactors magnetically operable by the rotation of said spindle to predetermined positions to decelerate and stop said motor.

5. In a machine tool spindle driving and positioning mechanism, a rotatable spindle, an electric motor for driving said spindle, an electrical power source, electrical control means for applying said power source to said motor including means to limit the application of current to the armature of said motor when accelerating said motor, variably adjustable means for opposing the counter E. M. F. of the armature of said motor to decelerate said motor, and magnetically actuated means for finally adjusting said counter E. M. F. opposing means to a maximum value when said spindle has rotated to a predetermined stop position, said electric motor being the sole means mechanically connected to said spindle to control the rotary movements thereof.

6. In an electric control for a machine tool spindle driving mechanism comprising a driving motor, a spindle adapted to be driven by said motor, a power circuit having an accelerating resistor serially connectable with the armature of said motor and a decelerating resistor adapted to be shunted across the armature of said motor, and means for operatively connecting said resistors in said power circuit including an inductive pilot circuit having control relay mechanism rendered operative by a pair of sequentially operated reactors upon rotation of said work spindle whereby the actuation of said first reactor effects an adjustment in said decelerating resistor to reduce the speed of rotation of said motor and in which the actuation of said second reactor adjusts said decelerating resistor to provide a substantially zero resistance across said armature while disconnecting said accelerating resistor from said power circuit.

7. In a machine tool having a power driven headstock including, a rotatable work spindle journaled in the headstock, and a driving motor mounted on said headstock adapted to drive said spindle, an electric power source for driving said motor, electric motor control means associated with said power source including means to effect acceleration of said motor to a running speed, means for initially decelerating said motor to an initial predetermined reduced speed, means rendered operative by the deceleration of said motor to render effective a reactor actuable by the rotation of said spindle to cause a further deceleration of said motor, and a second reactor rendered effective by the actuation of said first reactor actuable by the rotation of said spindle to a predetermined position to stop rotation of said motor.

8. In a machine tool, a headstock, a spindle journaled in said headstock, a driving motor mounted on said headstock, driving means interconnecting said motor and said spindle, a control disc on said spindle having a notch, a pair of spaced inductive reactors mounted on said headstock in operative relation with said control disc, an electric control circuit connected to said reactors, electrical power control means for said motor including switching means operated by said control circuit upon rotation of said notch in operative position with one of said reactors to effect a reduction of speed in said motor to a predetermined rate of rotation while rendering said second-mentioned reactor effective, and further switching means operated by said circuit upon rotation of said notch in operative relation with said second-mentioned reactor to stop rotation of said motor.

9. In a spindle control mechanism for a machine tool having a main driving motor for rotating the spindle, an electrical control mechanism including a start button operable when pressed to accelerate said motor from standstill to a running position, a stop button operable when pressed to decelerate said motor to an initial reduced speed, a reactor operable by the rotation of the spindle to a predetermined position to effect a further deceleration of said motor to a still slower speed, and a second reactor actuable by rotation of said spindle to another predetermined position to substantially instantly stop rotation of said motor and spindle.

10. In a machine tool spindle driving and control mechanism having a spindle and a driving motor for rotating said spindle, an electric control means for controlling the operation of said motor including a manually operable control switch to initiate a deceleration of said motor to a reduced predetermined speed, a reactor magnetically operated by rotation of said work spindle to effect a further deceleration to and operation of said motor at a still slower predetermined speed, and a second reactor magnetically operable by the rotation of said work spindle to a predetermined position to stop said motor.

11. In a control and positioning mechanism for a machine tool spindle having a prime mover for driving said spindle, the armature of said prime mover being connected directly across the line during running thereof, the combination of means for stopping said spindle in a predetermined rotary position including a decelerating resistance, a pilot control circuit including a stop button for connecting said resistance in shunt relation to the armature to initiate deceleration thereof, other circuit connections established by said stop button for automatically reducing said resistance after a predetermined deceleration of said armature, and means on the spindle movable into magnetically coupled relation with said pilot circuit upon a predetermined position of said spindle for short circuiting said resistance and immediately stopping said spindle in said predetermined position.

12. In a control and positioning mechanism for a machine tool spindle having a prime mover for driving said spindle, the armature of said prime mover being connected directly across the line during running thereof, the combination of means for stopping said spindle in a predetermined rotary position including a decelerating resistance, a pilot control circuit including a stop button for connecting said resistance in shunt relation to the armature to initiate deceleration thereof, other circuit connections established by said stop button for automatically reducing said resistance after a predetermined deceleration of said armature, and means on the spindle movable into magnetically coupled relation with said pilot circuit upon a predetermined position of said spindle for short circuiting said resistance and immediately stopping said spindle in said predetermined position, said means on the spindle being adjustable relative to the spindle for changing the stop position of the spindle.

EDILIO J. RIVOIRA.

REFERENCES CITED

The following references are of record in the file of this patent:

UNITED STATES PATENTS

| Number | Name | Date |
| --- | --- | --- |
| 1,064,224 | Ihlder | June 10, 1913 |
| 1,699,625 | Olofson | Jan. 22, 1929 |
| 1,781,792 | Rodman | Nov. 18, 1930 |
| 2,077,053 | Neuman | Apr. 13, 1937 |